(12) United States Patent
Chompff

(10) Patent No.: US 10,340,674 B1
(45) Date of Patent: Jul. 2, 2019

(54) REVERSIBLE CABLE SUPPORT BAR

(71) Applicant: A'n D Cable Products Inc., Concord, CA (US)

(72) Inventor: Conrad L. Chompff, Concord, CA (US)

(73) Assignee: A'N D CABLE PRODUCTS INC., Concord, CA (US)

( * ) Notice: Subject to any disclaimer, the term of this patent is extended or adjusted under 35 U.S.C. 154(b) by 0 days.

(21) Appl. No.: 16/055,009

(22) Filed: Aug. 3, 2018

Related U.S. Application Data

(63) Continuation-in-part of application No. 15/925,081, filed on Mar. 19, 2018.

(51) Int. Cl.
*H02G 3/04* (2006.01)
*F16L 3/137* (2006.01)
*G02B 6/44* (2006.01)
*A47B 46/00* (2006.01)
*A47B 57/04* (2006.01)
*A47B 47/02* (2006.01)

(52) U.S. Cl.
CPC ............ *H02G 3/0456* (2013.01); *F16L 3/137* (2013.01); *G02B 6/4452* (2013.01); *A47B 46/00* (2013.01); *A47B 47/022* (2013.01); *A47B 57/045* (2013.01)

(58) Field of Classification Search
CPC . F16L 3/223; F16L 3/2235; F16L 3/23; F16L 3/233
USPC ........ 248/49, 56, 57, 58, 65, 68.1, 235, 241, 248/243, 247, 248; 174/503, 79, 99 R; 385/135, 134, 136; 211/26.2, 90.1, 90.2, 211/187, 193, 75, 2
See application file for complete search history.

(56) References Cited

U.S. PATENT DOCUMENTS

| | | | | |
|---|---|---|---|---|
| 3,368,227 A | * | 2/1968 | Underdown, Jr. | ...... F16B 12/58 248/243 |
| 4,090,753 A | * | 5/1978 | Rock | ..................... A47B 88/956 248/243 |
| 5,954,301 A | * | 9/1999 | Joseph | ................. H01R 9/2416 248/68.1 |
| 6,170,784 B1 | * | 1/2001 | MacDonald | ......... H05K 7/1448 211/26 |
| 6,173,848 B1 | * | 1/2001 | Bravo | .................. H05K 7/1425 211/187 |
| 6,375,129 B2 | * | 4/2002 | Koziol | ...................... H02G 3/26 174/662 |
| 6,446,914 B1 | * | 9/2002 | Laberis | ................ H02G 3/0456 248/49 |
| 6,513,764 B2 | * | 2/2003 | Koziol | ...................... F16L 3/04 248/49 |

(Continued)

*Primary Examiner* — Terrell L McKinnon
*Assistant Examiner* — Michael McDuffie
(74) *Attorney, Agent, or Firm* — Weintraub Tobin; Zheng "Andy" Liu

(57) ABSTRACT

An example cable management tool, comprising: an elongated body portion having one or more sets of slots, a first part and a second part, both of which extend from the body portion and are configured to be attached to a chassis. The first part includes: a first arm portion, a first U-shape slot on a first end of the first arm portion, a second U-shape slot on a second end of the first arm portion, and the first end and the second end are opposite ends. The second part includes: a second arm portion, a third U-shape slot on a first end of the second arm portion, a fourth U-shape slot on a second end of the second arm portion, and the first end and the second end are opposite ends.

19 Claims, 10 Drawing Sheets

(56) References Cited

U.S. PATENT DOCUMENTS

| | | | |
|---|---|---|---|
| 6,568,542 B1 * | 5/2003 | Chen | H04Q 1/06 211/26 |
| 6,818,834 B1 * | 11/2004 | Lin | H02G 3/32 174/135 |
| 7,004,334 B2 * | 2/2006 | Walsh | A47F 7/28 211/75 |
| 7,091,418 B1 * | 8/2006 | Clark | G02B 6/4452 174/135 |
| 7,345,241 B2 * | 3/2008 | Caveney | H01R 9/2416 174/135 |
| 7,352,947 B2 * | 4/2008 | Phung | G02B 6/4459 248/49 |
| 7,769,266 B2 * | 8/2010 | Morris | H04Q 1/023 385/135 |
| 8,093,499 B2 * | 1/2012 | Hoffer | H02G 3/0456 174/68.1 |
| 8,872,030 B2 * | 10/2014 | McNeal | F16L 3/00 174/101 |
| 8,936,221 B2 * | 1/2015 | Rouleau | H02G 3/32 248/73 |
| 9,841,574 B1 * | 12/2017 | Pilon | G02B 6/3897 |
| 2002/0158032 A1 * | 10/2002 | Belokin | A47F 5/08 211/71.01 |
| 2004/0035983 A1 * | 2/2004 | Simonson | H02G 15/007 248/49 |
| 2008/0099635 A1 * | 5/2008 | Laursen | F16L 3/221 248/68.1 |
| 2008/0111032 A1 * | 5/2008 | Yang | H05K 7/1491 248/68.1 |
| 2008/0237408 A1 * | 10/2008 | McClellan | H04Q 1/06 248/68.1 |
| 2009/0179116 A1 * | 7/2009 | St-Louis | G02B 6/4452 248/68.1 |
| 2015/0103488 A1 * | 4/2015 | Tanaka | H05K 7/1491 361/679.58 |
| 2015/0380918 A1 * | 12/2015 | Kellerman | H02G 3/0443 248/68.1 |
| 2017/0184224 A1 * | 6/2017 | Cheng | F16L 3/137 |
| 2019/0027909 A1 * | 1/2019 | Mifsud | H02G 3/32 |

\* cited by examiner

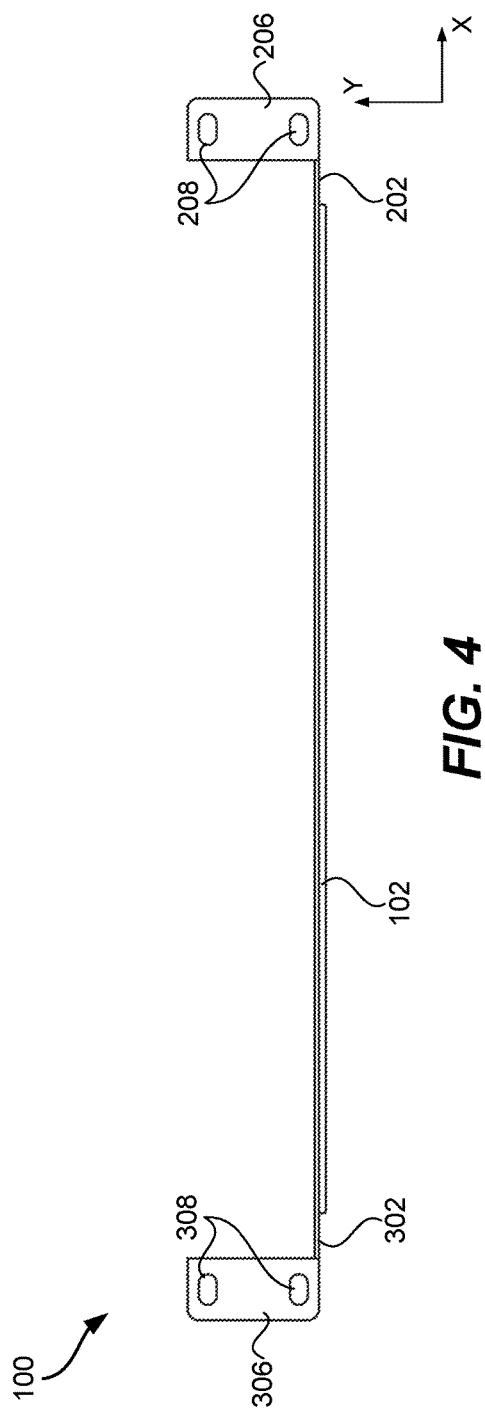
FIG. 4
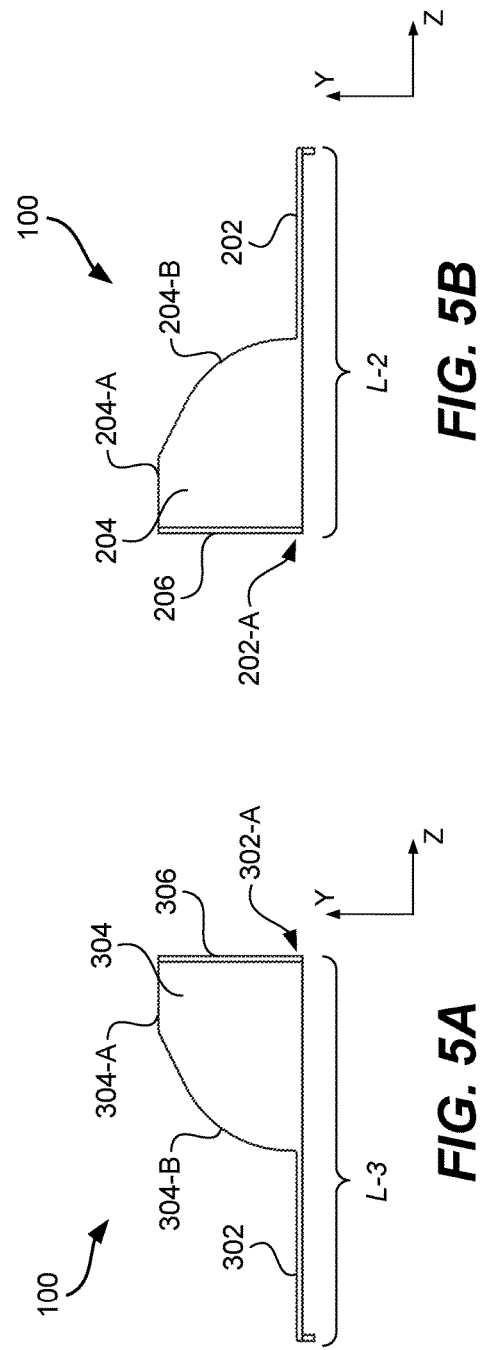
FIG. 5A
FIG. 5B

REVERSIBLE CABLE SUPPORT BAR

RELATED APPLICATION

This application is a continuation-in-part of U.S. patent application Ser. No. 15/925,081, filed Mar. 19, 2018, and entitled "reversible cable support bar," which is hereby incorporated by reference in its entirety.

TECHNICAL FIELD

The present disclosure generally relates to cable management tools and more specifically to a reversible cable support bar.

BACKGROUND

Cable management often refers to spatially organizing electrical or optical cables inside a switch chassis, a cabinet, or an installation. Inside a switch chassis, for example, data and power cables can easily become tangled, making them difficult to work with and the computer equipment (to which these cables connect) inconvenient to access by an IT technologist. Second, dis-organized cables can block or reduce air flows needed to cool off the computer equipment, resulting in over-heating (on the equipment side) and ineffective heat management (on the data center side).

Disorganized cables make it more difficult for a technician to troubleshoot systems costing the organization lost time, productivity and money.

Effective cable management solutions should, therefore, not only support, but also contain cables within an installation. The above identified technical problems are reduced or eliminated by the systems and methods disclosed in the present disclosure.

SUMMARY

Embodiments of cable management tools, as well as method and computer executable instructions for manufacturing the cable management tools are provided in the present disclosure.

A cable management tool, in some implementations, comprises: an elongated body portion having one or more sets of slots configured to be filled with cable ties, a first part extending from a first end of the body portion and configured to be attached to a chassis, and a second part extending from a second end of the body portion and configured to be attached to the chassis.

Each set of slots of the one or more sets of slots has at least two slots with a same shape. The first part extending from a first end of the body portion and configured to be attached to a chassis and may include: a first arm portion having a first length, a first U-shape slot on a first end of the first arm portion, and a second U-shape slot on a second end of the first arm portion. The first end and the second end are opposite ends of the first arm portion.

The second part extending from a second end of the body portion and configured to be attached to the chassis and may include: a second arm portion having a second length, a third U-shape slot on a first end of the second arm portion, and a fourth U-shape slot on a second end of the second arm portion. The first end and the second end are opposite ends of the second arm portion.

In some implementations, the first U-shape slot and the second a first U-shape slot have different depths. In some alternative implementations, the first U-shape slot and the second a first U-shape slot have a same depth.

In some implementations, the body portion is made of metal.

In some implementations, the body portion is of a rectangular bar shape.

In some implementations, the body portion is configured to support a predefined number of cables.

In some implementations, the one or more cables may be positioned across the body portion and beyond the first end of the body portion.

In some implementations, the first part and the second part form a gap between the first part, the second part, and the body portion.

In some implementations, the body portion, the first part and the second part are a monolithic metallic structure.

In some implementations, the elongated body portion includes a hard-surface.

In some implementations, the hard-surface provides a predefined degree of movement-resistance.

In some implementations, the first arm portion and the second arm portion are of a same H-shape.

In some implementations, the first arm portion and the second arm portion are of different shapes.

In some implementations, the one or more sets of slots include a first set of slots and a second set of slots, wherein the first set of slots are perpendicular to the second set of slots.

In some implementations, the first set of slots of includes slots of a first shape, and the second set of slots includes slots of a second shape different from the first shape.

In some implementations, the first set of slots includes slots of a first size, and the second set of slots includes slots of a second size different from the first size.

In some implementations, the first set of slots includes a predefined distance between each slot in the first set of slots.

In some implementations, the first part and the second part, when attached to the chassis, causes the body portion to be secured to the chassis.

In some implementations, the cable management tool is configured to reversibly attach to the chassis upside down.

Other implementations of this disclosure include corresponding devices, systems, and computer programs, as well as and associated methods for manufacturing the described devices and systems. These other implementations may each optionally include one or more of the following features. For instance, provided is a computer-implemented method for manufacturing the cable management tool as described in any of the implementations above. Further described is a non-transitory computer readable medium comprising computer executable instructions stored thereon, which, when executed by one or more computers, cause a machine to manufacture the cable management tool as described in any of the implementations above.

These and other embodiments are described further below with reference to the figures.

BRIEF DESCRIPTION OF THE DRAWINGS

FIG. 4 illustrates a back view of an example cable management tool, in accordance with one or more embodiments.

FIGS. 5A and 5B illustrate side views of an example cable management tool, in accordance with one or more embodiments.

Figure 1:
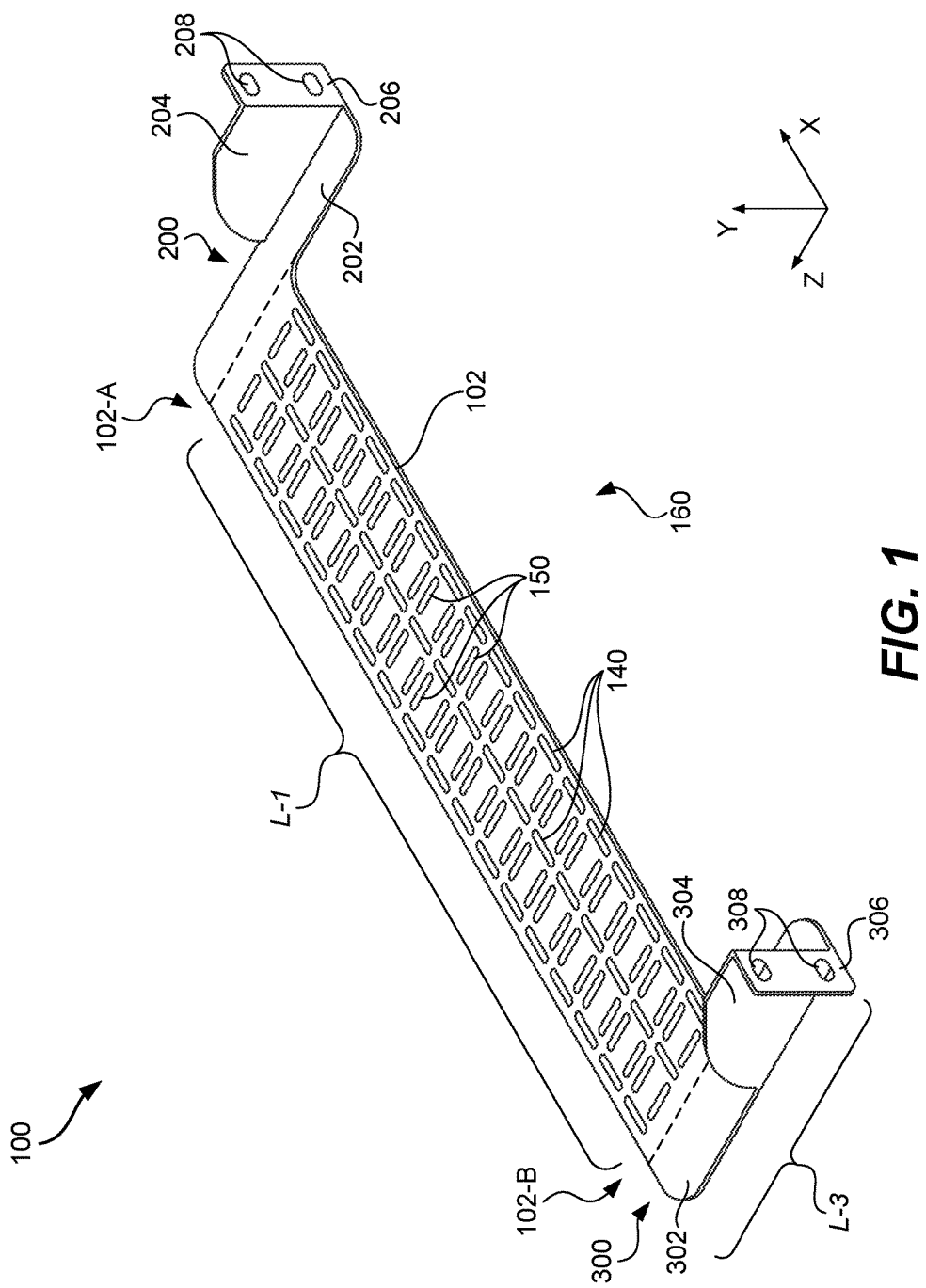
FIG. 1 illustrates a perspective view of an example cable management tool, in accordance with one or more embodiments.

Embodiments of the present disclosure and their advantages are best understood by referring to the detailed description that follows. It should be appreciated that like reference numerals are used to identify like elements illustrated in one or more of the figures; showings therein are for purposes of illustrating embodiments of the present disclosure and not for purposes of limiting the same.

DETAILED DESCRIPTION

The present disclosure provides example cable management tools, e.g., reversible cable support bars, as well as systems and methods for manufacturing the same. The technologies described in the present disclosure can provide the following technical advantages. First, a chassis capable of providing greater physical cable support can support a larger number of computing devices and their connection cables on the chassis, saving real estate in a data room. Second, making the cable management tool detachable from the chassis provides more flexibility for a computer technologist to organize computer or network equipment on a rack and in a data room. Third, a reversible orientation of the cable management tool provides further flexibility in organization and equipment rack space conservation and optimization.

Fourth, reinforcing panels of the cable management tool are configured to add stability to the cable management tool while providing a pathway for convenient and efficient layout of cables. Fifth, providing specific cable tie positions helps further contain cables within a chassis, making the computer equipment accommodated on the chassis more accessible to a technician or the like. Additional details of implementations are now described in relation to the Figures.

Figure 2:
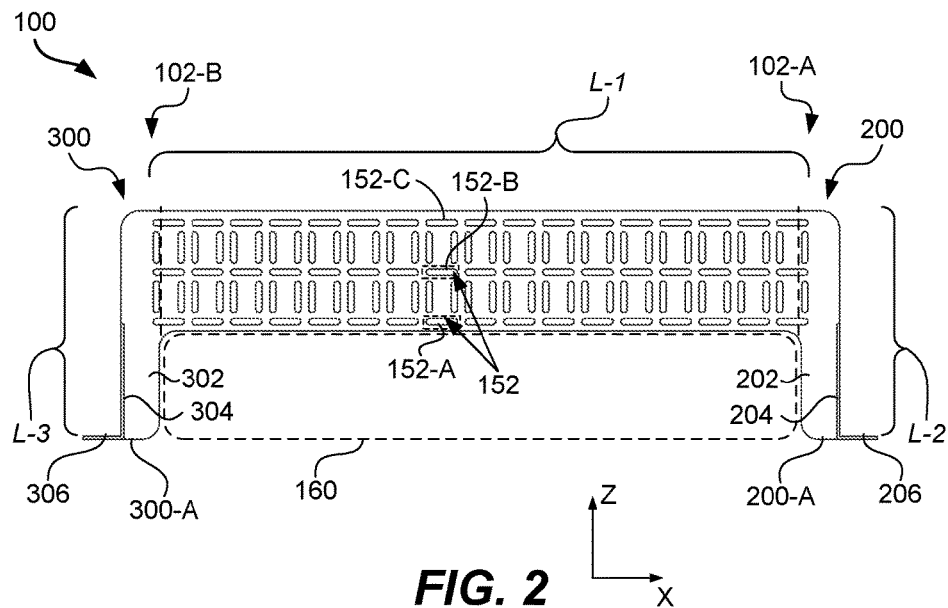
FIG. 2 illustrates a top view of an example cable management tool, in accordance with one or more embodiments.
Figure 3:
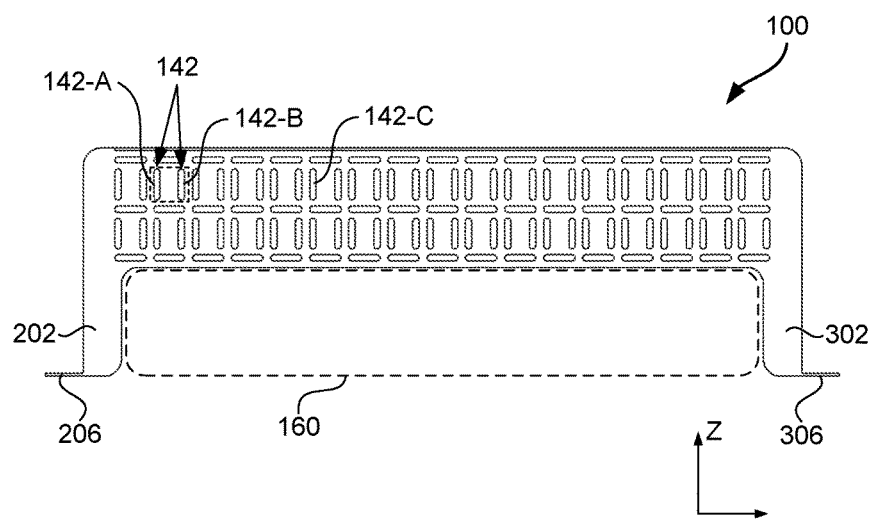
FIG. 3 illustrates a bottom view of an example cable management tool, in accordance with one or more embodiments.

FIG. 1 illustrates a top view of a cable management tool 100, in accordance with one or more embodiments. FIG. 2 illustrates a top view of a cable management tool, in accordance with one or more embodiments. FIG. 3 illustrates a bottom view of a cable management tool, in accordance with one or more embodiments. FIG. 2 depicts a top surface of cable management tool 100, while FIG. 3 depicts a bottom surface of cable management tool 100. FIG. 4 illustrates a back view of a cable management tool, in accordance with one or more embodiments.

Elongated Body Portion

As shown in the figures, cable management tool 100, in some implementations, is a detachable reversible cable support bar. For example, a reversible cable support bar can be attached to and detached from a chassis through which cables may travel. As such, the cable management tool 100 may be referred to as a reversible cable support bar in the present disclosure. An example reversible cable support bar 100 may be deemed to comprise of three main parts: a body portion 102, a first part 200, and a second part 300. The body portion 102 may also be referred to as a supporting surface in the present disclosure, as the body portion 102 provides physical support to cables within a chassis (to which the cable management tool 100 is attached). In the described embodiments, body portion 102 may be an elongated structure with a length L-1 between first end 102-A and second end 102-B, along the X-axis as depicted in FIGS. 1-4, 5A, and 5B.

The body portion 102 may include one or more sets of slots, including longitudinal slots 140 and latitudinal slots 150. As depicted, longitudinal slots 140 may include an elongated configuration with a length substantially parallel to the length L-1 of body portion 102. As depicted, latitudinal slots 150 may include an elongated configuration with a length substantially perpendicular to the length L-1 of body portion 102.

Slots that form a set may comprise aligned slots of the same type. For example, as illustrated in FIG. 2, an example slot-set 152 includes longitudinal slots 152-A and 152-B. Cable ties can go through the slots 152-A and 152-B to secure a cable to the body portion 102. In some embodiments, slot 152-A or 152-B may also form a slot-set with slot longitudinal slot 152-C. For example, a cable tie may be implemented through slots 152-A and 152-C to secure a larger bundle of cables. In various embodiments, any two aligned slots of the same type of slot may be grouped as a slot-set.

As another example, slot-set 142 includes latitudinal slots 142-A and 142-B, as shown in FIG. 3. These slots of the other orientation may also be used to secure a data cable to the supporting surface 102. In some embodiments, slot 142-A or 142-B may also form a slot-set with slot longitudinal slot 142-C. For example, a cable tie may be implemented through slots 142-A and 142-C to secure a larger bundle of cables.

In some implementations, slots included in a slot-set have a same shape so that a uniformly-shaped cable tie, e.g., a pipe-shaped cable tie, can go through both slots in the pair. The slots may be configured to include various other shapes to accommodate different cable ties. In other implementations, slots included in a slot-set may have different shapes, e.g., different sizes or shapes of openings, to accommodate cable ties having varying shapes, e.g., a cable tie that is slimmer on one end, but increases its thickness gradually towards the other end.

As shown in FIGS. 1-3, the body portion 102 of the cable management tool 100, in some implementations, is of a rectangle bar shape. In some implementations, the body portion 102 is of a different shape, for example, a square shape or a slimmer bar shape, to provide more support to heavy-duty wires or cables or to save room within the chassis for other equipment, respectively. In the implementations where several support bars are equipped to a chassis, the several support bars may each have a different design (e.g., made of different materials or having different shapes or slot openings).

The body portion 102 of the cable management tool 100, in some implementations, is made of metal, hard plastic, PVC materials, or a combination of these materials, to provide sufficient support to cable located within a chassis.

The body portion 102 of the cable management tool 100, in some implementations, is configured to support a predefined number of cables. For example, the body portion 102 may be designed to specifically support a particular number of cables, e.g., 10, 20, 30, or 50, if the capacity of a chassis (e.g., the total number of computing equipment to be placed or included in the chassis) is known. These customization techniques allow a cable support bar to be customized to its potential capacity or intended utility with reduced budget and lesser manufacturing material.

The body portion 102 of the cable management tool 100, in some implementations, includes a hard-surface. The hard-surface may provide a predefined degree of movement-resistance. For example, the upper surface of the body portion 102 (shown in FIG. 2) may be covered with a rubber layer to further restrain the movement of cables within a chassis. For another example, the surface of the body portion 102 may be covered with materials that provide a predefined amount of physical movement resistance, such that force incidentally generated by nearby devices (e.g., air flows generated by a heat dissipation fan located within the same chassis) would not result in unintended cable movement.

The present disclosure also provides various slotting technologies relating to a supporting surface 102. As previously described, the one or more set of slots of the cable management tool 100 may include sets of longitudinal slots 150 and sets of latitudinal slots 140. Each slot type may have an elongated configuration with lengths substantially parallel to the lengths of the other slot type.

However, each slot type may have different shapes. In some implementations, the longitudinal slots 140 may include an opening with a first shape, and the latitudinal slots 150 may include an opening with a second shape different from the first shape. For example, the slot-set 142 may provide openings that are of a substantially rectangle shape, while the slot-set 152 may provide openings with substantially rounded corners. Furthermore, each type of slot may have different sizes. In some implementations, the first set of slots may include slots of a first size, and the second set of slots may include slots of a second size different from the first size. For example, the slot-set 152 may provide round slots that are 0.2" in diameter, while the slot-set 142 may provide round slots that are 0.4" in diameter.

In some embodiments, different slot-sets may have different sizes (e.g., widths or heights). In some implementations, a respective set, in the one or more sets, of slots includes a predefined distance between slots in the respective set. For example, the distance or size of a slot-set can be customized to accommodate cable having different sizes. A narrower slot-set may better secure a thinner cable, e.g., a smaller USB cable; while a wider slot-set may better secure a wider cable, e.g., a heavy-duty power cable.

As shown in FIGS. 2 and 3, the support bar 100 accommodates three rows of 17 longitudinal slots 140 and 2 rows of 34 latitudinal slots 150. In some implementations, the total number of longitudinal slots 140 and latitudinal slots 150 provided on a reversible cable support bar may be different and vary depending on desired configurations. These customization techniques can provide greater flexibility in terms of cable management, as the number of cables to be managed horizontally may be different from that of cables to be managed vertically.

First and Second Parts

Each of the first part 200 and the second part 300 may extend from an individual end of body portion 102. As used herein, the first part 200 may be referred to as a right part, and the second part 300 may be referred to as a left part. First part 200 may extend from first end 102-A and may include arm portion 202 with a length L-2 along the Z-axis that is perpendicular to length L-1. Arm portion 202 extends from the body portion 102 to a distal edge 202-A. Similarly, left arm 300 may extend from second end 102-B and includes arm portion 302 with a length L-3 along the Z-axis that is perpendicular to length L-1. Arm portion 302 extends from the body portion 102 to a distal edge 302-A.

As illustrated in FIG. 1, a dashed line is used to delineate each part 200 and 300 from body portion 100, for illustrative purposes. In some embodiments, the first part and second part may also include one or more slots, or portions of slots.

Each part 200 and 300 may be configured to be attached to a chassis. Attaching the first part 200 and the second part 300 to a chassis would result in the body portion 102 to be also secured to the chassis, containing the positions of the cables secured to the first part 102 within the chassis.

Each part may include an arm portion and a panel with an attachment surface. First part 200 may include first arm portion 202 coupled to first panel 204 with first attachment surface 206. Second part 300 may include second arm portion 302 coupled to with second attachment surface 306. Each attachment surface may include holes, such as holes 208 on attachment surface 206 and holes 308 on attachment surface 306. Fasteners, such as mounting screws, bolts, or other fastening means, may be inserted through one or more holes of holes 208 and 308 to secure cable management tool 100 onto a chassis.

An attachment surface may also be referred to a bracket, an intermediate component for fixing one part to another, usually larger, part. For example, the first attachment surface 206 fixes the first part 200 to a chassis; the second attachment surface 206 fixes the second part 300 to the chassis.

In various embodiments, each panel is coupled to a respective arm portion. FIGS. 5A and 5B illustrate side views of a cable management tool, in accordance with one or more embodiments. With reference to FIGS. 5A and 5B, each panel may comprise a substantially flat structure that is configured perpendicularly to the respective arm portions. Each panel includes a top edge and a rounded edge. Panel 204 includes a top edge 204-A and a rounded edge 204-B, while panel 304 includes a top edge 304-A and rounded edge 304-B. The top edges may comprise a substantially flat edge, while the rounded edges include a curved shape. However, in various embodiments, panels 204 and 304 may include different shapes. For example, the top edge and rounded edge may form a single continuous rounded edge. As another example, the rounded edges may be straight or the panels may comprise a rectangular shape. In some embodiments, each panel may include a different shape with respect to the other panel.

As further illustrated, each panel does not extend the entire length of the respective arm portion. As such, panel 204 begins at distal edge 202-A of arm 202, and does not extend the entire length L-2. Similarly, panel 304 begins at edge 302-A of arm 302, and does not extend the entire length L-3.

This configuration eliminates any obstruction of the upper surface of body portion 102, and provides a passage above the upper surface of body portion 102 along, and past, length L-1 at either direction. Thus, cords and cables may be positioned to travel past the first end 102-A and/or the second end 102-B, and past the respective arm portions of parts 200 and 300. This provides the technical advantage of greater customization in the positioning and organization of cables, and a greater degree of fastening ability of cables to a reversible cable support bar and a chassis, without significantly increasing the difficulties for uninstallation or modification.

The first part 200 and the second part 300 of the cable management tool 100 may have a common shape, as described above. The first part 200 and the second part 300 may alternatively have different shapes, for example, when the racks (on a same chassis) to which these parts may be attached have different shapes or different fastening mechanisms.

Each attachment surface may comprise a substantially flat structure that is positioned perpendicularly to both the respective arm portions and the respective panels. In some embodiments, the attachment surfaces may be aligned with the distal end of the respective arm portions. The perpendicular configuration of the arm portions, panels, and attachment surfaces may serve to reinforce the stability of the structure of cable management tool 100.

Additionally, parts 200 and 300 may be configured such that a gap 160 is formed between the body portion 102 and arm portions 200 and 300. Gap 160 is further shown via dashed lines in FIGS. 2 and 3 for illustrative purposes. In some embodiments, gap 160 provides an offset to allow for various computer and electronic components, such as cable attachments, electrical connectors, wire ports, etc. Such gap 160 may also allow passage of cables secured to cable management tool 100 to areas above or below the surface of body portion 102. The configuration of gap 160 provides additional technical advantages of greater customization in the positioning and organization of cables, and a greater degree of fastening ability of cables to a reversible cable support bar and a chassis, without significantly increasing the difficulties for uninstallation or modification.

Structural Modification

In some implementations, the body portion 102, the second part 200 and the third part 300 comprise a single monolithic structure. Such monolithic structure may be constructed of metal or plastic, e.g., for the ease of molding, manufacturing, or both. In some embodiments, body portion 102, first part 200, and second part 300 may be separate structures that are welded to form a monolithic structure.

Alternatively, in other implementations, parts 200 and 300 may be snap-on parts that are detachable from the body portion 102. For example, the first part 200 and second part 300 are separate pieces that can be latched or fastened to and detached from the body portion 102, on an as-needed basis. Having first part 200 and second part 300 separable from (e.g., attachable to and detachable from) the body portion 102 is technically advantageous, as these techniques would allow the first part 200 and the third part 300 to be customized to the design of a chassis and racks provided thereon, without the needed to modify the design of body portion 102 or re-manufacturing the entire support bar.

In some embodiments, body portion 102 may comprise multiple identical snap-on segments, which are attachable to and detachable from one another. This would allow the length L-1 of body portion 102 to be adjusted and customized to the design of a chassis without modification of the design of the chassis or the support bar 100. In some embodiments, each panel is an integral structure with the respective arm portion. In other implementation, the panels are snap-on elements that are detachable from the respective arm portion.

Chassis Configuration

Figure 6A:
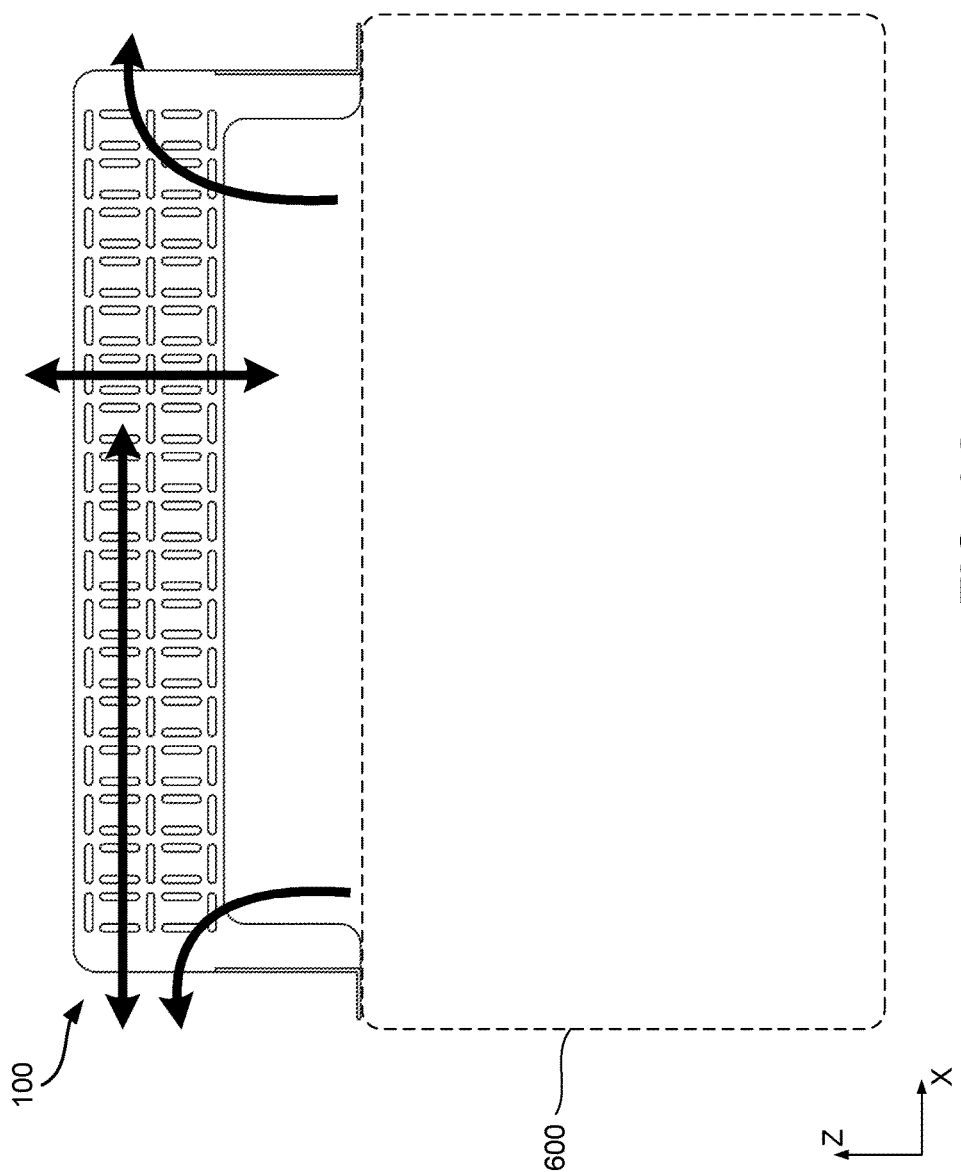
FIGS. 6A and 6B illustrate a cable management tool coupled to a chassis system, in accordance with one or more embodiments.
Figure 6B:
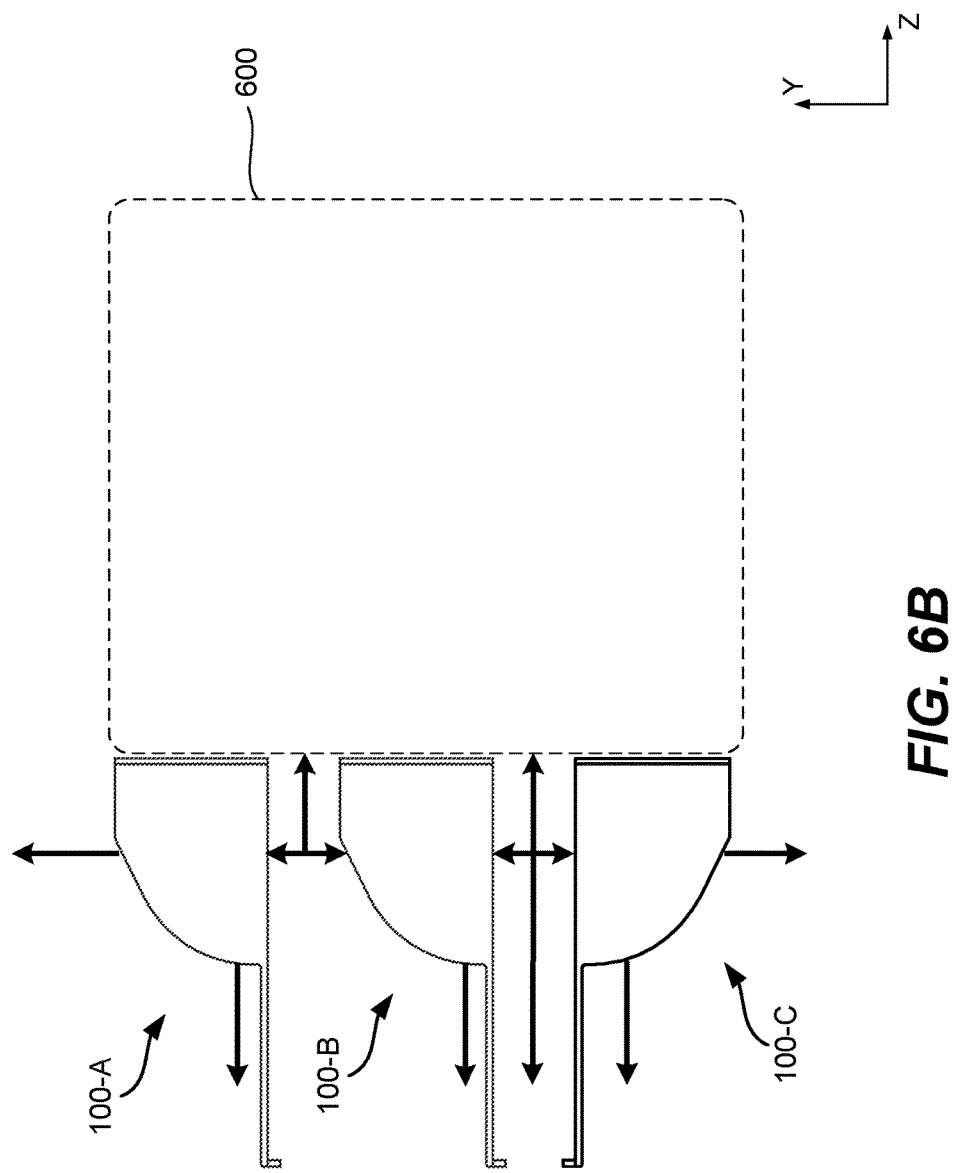

The first part 200 and the second part 300, when attached to a chassis, cause the body portion to be fixed to the chassis. FIGS. 6A and 6B illustrate a cable management tool 100 coupled to a chassis system 600, in accordance with one or more embodiments. FIG. 6A illustrates a top view of a cable management tool attached to a chassis. FIG. 6B illustrates a side view of multiple cable management tools attached to a chassis. Chassis system 600 is presented with dashed lines and, in various embodiments, chassis system 600 may be a switch chassis, cabinet, or other installation that supports various electronic and computer components.

As shown in FIG. 6B, the support bar may be attached to different parts (e.g., different positions) of the chassis system 600. For example, chassis system 600 may include multiple holes that may be aligned with holes 208 and/or 308, and configured to receive a fastener, such as a screw or bolt, to secure the support bar 100 to chassis system 600. FIG. 6B illustrates three support bars 100-A, 100-B, and 100-C secured to chassis system 600. Such support bars 100-A, 100-B, and 100-C may include configurations as presently described with reference to cable management tool 100. However, it should be recognized that other support bars, or no support bars, may be positioned in place of those depicted in FIG. 6B.

As such, a layering-effect may be provided with several support bars (100-A, 100-B, and 100-C) attached to the chassis system 600 at the same time, allowing cables going into or coming out of the components in chassis 600 to be secured to different support bars attached to the different levels of the chassis 600, separating cable onto different spatial layers.

In some embodiments, cable management tool 100 may be reversibly secured to a chassis 600. As illustrated in FIG. 6B, laser bar 100-C is configured to be attached upside down relative to laser bars 100-A and 100-B. As such, the upper surface and lower surface of body portion 102 of laser bar 100-C would be reversed. This reversible configuration provides for additional flexibility in customization, and equipment rack space conservation and optimization, of a chassis system 600.

The arrows illustrated in FIGS. 6A and 6B demonstrate potential pathways for cables originating from components within chassis 600, as well as cables originating from other components separate from chassis 600. As shown, when attached to a chassis system 600, cable management tools, as described herein, provide free unencumbered passage for cables both vertically and horizontally and allow for greater customization in the positioning and organization of cables and increased degree of fastening. FIG. 6A depicts unrestricted passageways for cables along the X-Z plane across and beyond length L-1 of body portion 102. FIG. 6B depicts unrestricted vertical passageways for cables through gaps, such as gap 160 formed by the support bars, as well as horizontal passageways to and from chassis 600.

As shown in FIG. 4, the width of the first part 102 may be 1¾"; the length of the first part 102 may be 17⅜" I.D. and 17½" O.D. Both the second part and the third part may have a no more than 3/16" I.D turned in; the height of the second part and the third party may be 11/16" I.D. Other dimensions may also be used on the first part, the second part, and the third part to accommodate different chassis.

Method of Manufacture

Figure 7:
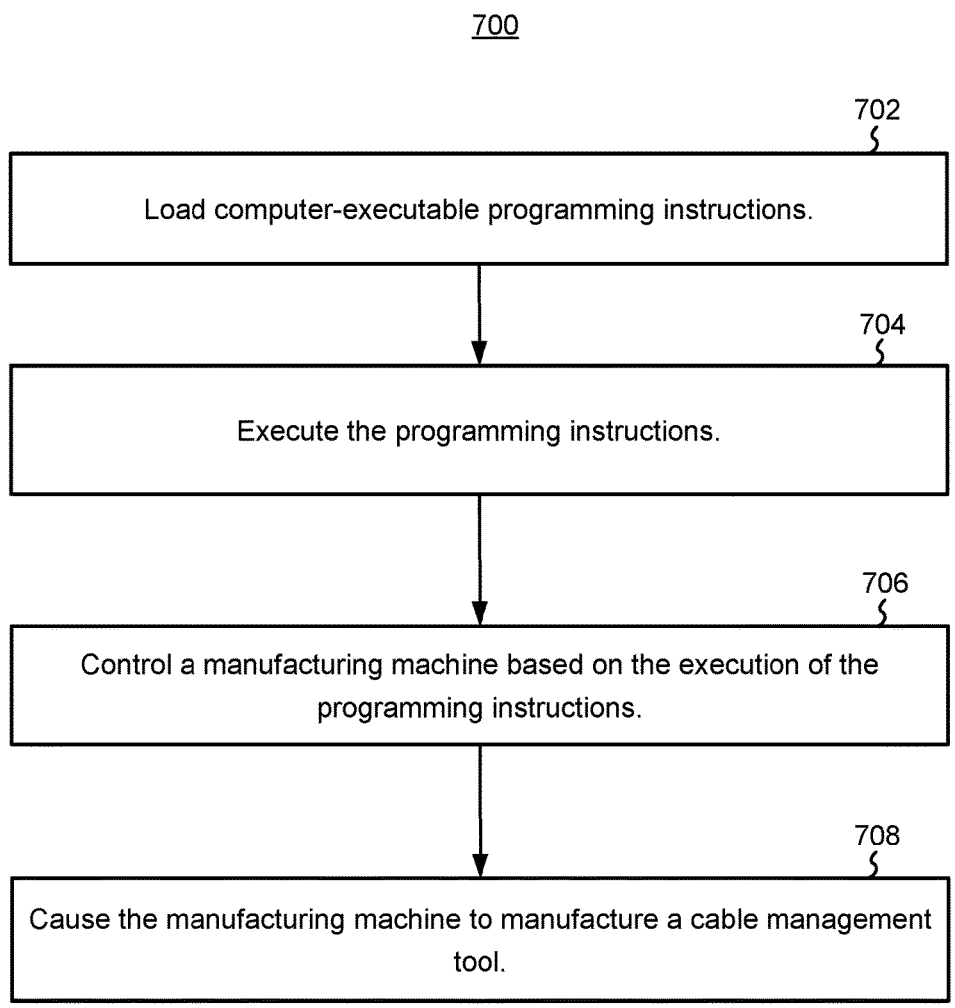
FIG. 7 is a flowchart illustrating an example computer-implemented method for manufacturing a cable management tool.

FIG. 7 is a flowchart illustrating an example computer-implemented method 600 for manufacturing a cable management tool. The computer-implemented method 700 may be used to manufacture sat least the cable management tools shown with references to FIGS. 1 and 9. The computer system 800, when properly programmed, can execute the method 700.

In various implementations, the method 700 includes using a computer to load (702) computer-executable programming instructions from a non-volatile memory of the computer to a volatile memory of the computer. After loading the programming instructions, the computer may execute (704) the programming instructions using the volatile memory.

Based on the execution of the programming instructions, the computer may control (706) a manufacturing machine, for example, a cutting machine, a molding machine, or a pressing machine. By controlling the manufacturing machine, the computer causes (708) the manufacturing machine to manufacture a cable management tool as described in one or more of the implementations disclosed in the present disclosure.

Figure 8:
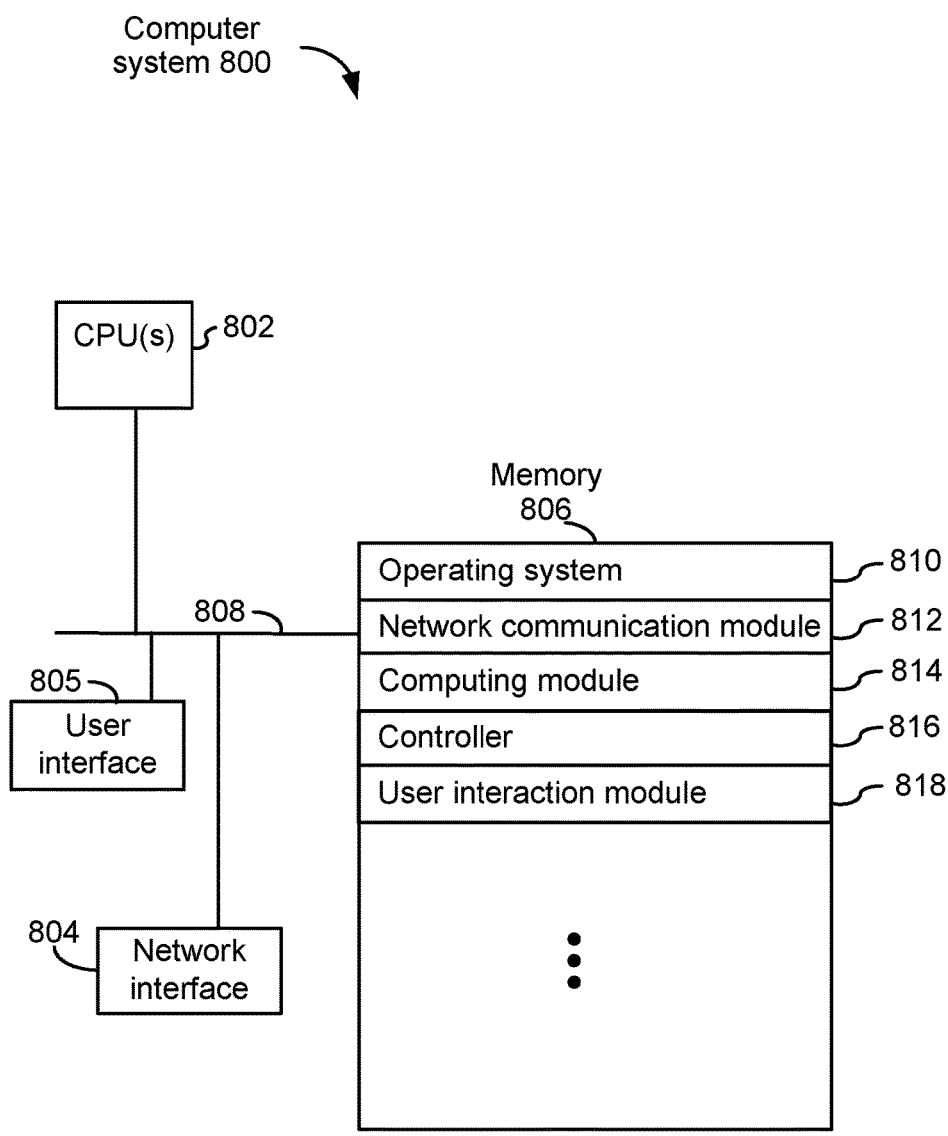
FIG. 8 is a block diagram illustrating an example computer system for manufacturing a cable management tool.

FIG. 8 is a block diagram illustrating an example computer system 800 for manufacturing a cable management tool. The computer system 800 may be used to manufacture at least the cable management tools shown with references to FIGS. 1 and 9. The computer system 800 in some implementations includes one or more processing units CPU(s) 802 (also referred to as processors), one or more network interfaces, optionally a user interface, a memory 806, and one or more communication buses 810 for interconnecting these components. The communication buses 810 optionally include circuitry (sometimes called a chipset) that interconnects and controls communications between system components. The memory 606 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 806 optionally includes one or more storage devices remotely located from the CPU(s) 100. The memory 806, or alternatively the non-volatile memory device(s) within the memory 806, comprises a non-transitory computer readable storage medium. In some implementations, the memory 806 or alternatively the non-transitory computer readable storage medium stores the following programs, modules and data structures, or a subset thereof:

- an operating system 810 (e.g., an embedded Linux operating system), which includes procedures for handling various basic system services and for performing hardware dependent tasks;
- a network communication module 812 for connecting the computer system with a manufacturing machine via one or more network interfaces (wired or wireless);
- a computing module 814 for executing programming instructions;
- a controller 816 for controlling a manufacturing machine in accordance with the execution of programming instructions; and
- a user interaction module 818 for enabling a user to interact with the computer system 800.

One or more of the above identified elements may be stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory optionally stores a subset of the modules and data structures identified above. Furthermore, the memory may store additional modules and data structures not described above.

Figure 9:
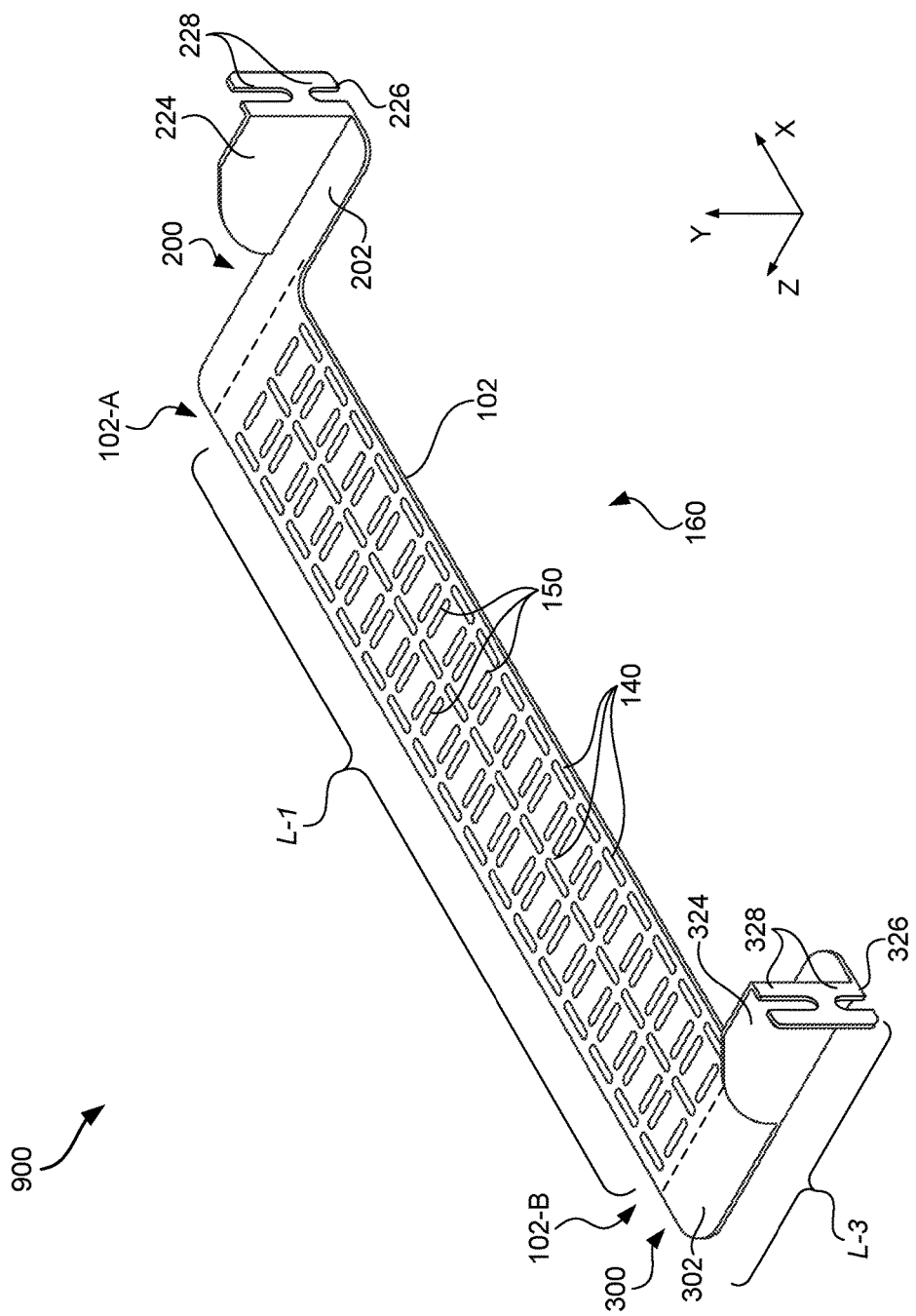
FIG. 9 illustrates a perspective view of a second example cable management tool, in accordance with one or more embodiments.

FIG. 9 illustrates a perspective view of a second example cable management tool 900, in accordance with one or more embodiments.

As shown in FIG. 9, the reversible cable support bar 900 may be deemed to comprise of three main parts: a body portion 102, a first part 200, and a second part 300. In the described embodiments, body portion 102 may be an elongated structure with a length L-1 between first end 102-A and second end 102-B, along the X-axis as depicted in FIGS. 1-4, 5A-5B, and 8-10.

The body portion 102 may include one or more sets of slots, including longitudinal slots 140 and latitudinal slots 150. As shown, longitudinal slots 140 may include an elongated configuration with a length substantially parallel to the length L-1 of body portion 102. As shown, latitudinal slots 150 may include an elongated configuration with a length substantially perpendicular to the length L-1 of body portion 102.

Slots that form a set may comprise aligned slots of the same type. For example, as illustrated in FIG. 2 (which also illustrates a top view of the cable management tool 900), an example slot-set 152 includes longitudinal slots 152-A and 152-B. Cable ties can go through the slots 152-A and 152-B to secure a cable to the body portion 102. In some embodiments, slot 152-A or 152-B may also form a slot-set with slot longitudinal slot 152-C. For example, a cable tie may be implemented through slots 152-A and 152-C to secure a larger bundle of cables. In various embodiments, any two aligned slots of the same type of slot may be grouped as a slot-set.

As another example, slot-set 142 includes latitudinal slots 142-A and 142-B, as shown in FIG. 3, which also illustrates a bottom view of the cable management tool 900. These slots of the other orientation may also be used to secure a data cable to the supporting surface 102. In some embodiments, slot 142-A or 142-B may also form a slot-set with slot longitudinal slot 142-C. For example, a cable tie may be implemented through slots 142-A and 142-C to secure a larger bundle of cables.

As shown in FIGS. 2-3 and 9, the body portion 102 of the cable management tool 900, in some implementations, is of a rectangle bar shape. In some implementations, the body portion 102 is of a different shape, for example, a square shape or a slimmer bar shape, to provide more support to heavy-duty wires or cables or to save room within the chassis for other equipment, respectively.

Each of the first part 200 and the second part 300 may extend from an individual end of body portion 102. Each part (either the first part 200 or the second part 300) may include an arm portion and a panel with an attachment surface. As shown in FIG. 9, the first part 200 of the cable management tool 900 may include first arm portion 202 coupled to first panel 224 with first attachment surface 226. Second part 300 may include second arm portion 302 coupled to second panel 324 with second attachment surface 326.

As shown in FIG. 9, the bracket 226 includes two U-shape slots 228. Similarly, the bracket 326 includes two U-shape slots 328. Fasteners, such as mounting screws, bolts, or other fastening means, may be inserted through one or more U-shape slots of slots 228 and 328 to secure the cable management tool 100 onto a chassis.

Including U-shape slots are on a bracket is technically advantageous. For example, mounting screws that have been inserted into the U-Shape slots may need to be loosened—as opposed to completely removed, as in the case of the cable management tool 100—in order to remove the cable management tool 900 from a chassis. Requiring less screw movements is significant, especially, when the cable management tool 900 is reversible. When reversing the position of a cable management tool (rotate the cable management tool 180 degrees), a user is not required to completely remove the mounting screws. This is technically advantageous, when a user has only a limited space to work with when installing or uninstall a cable management tool. Also, in some implementations, it may be advantageous not to remove the mounting screws too frequently or completely. The U-shape brackets can provide these technical advantages.

Figure 10:
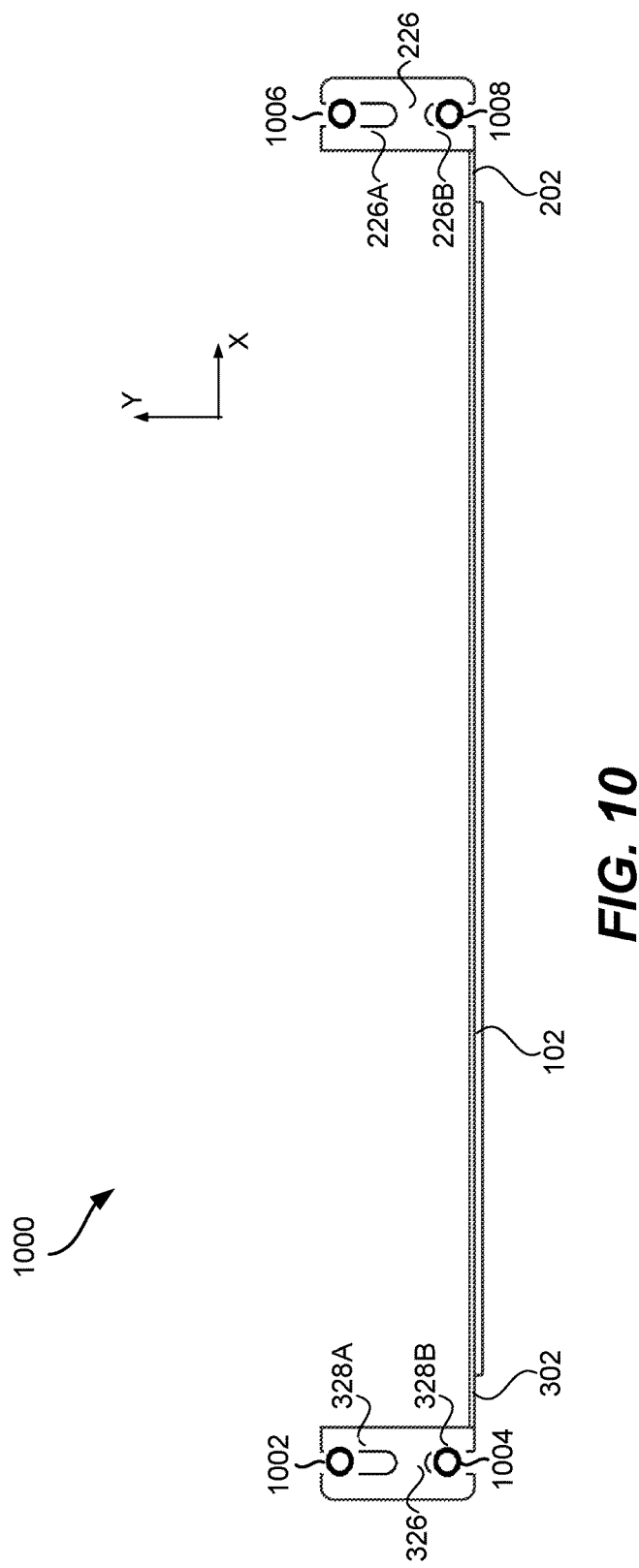
FIG. 10 illustrates a back view of the second example cable management tool, in accordance with one or more embodiments.

FIG. 10 illustrates a back view of the second example cable management tool 1000, in accordance with one or more embodiments.

As shown in FIG. 10, the second example cable management tool 1000 includes one bracket at either end. For example, in the back view, bracket 326 is located on the left and the bracket 226 is located on the right. Each bracket includes two U-shape slots. For example, the bracket 326 includes U-shape slots 328A and 328B; the bracket 226 includes U-shape slots 228A and 228B. Each U-shape slot includes an opening on top end of the U-shape and a curved bottom (e.g., a U-shaped bottom) on the other end. Screws 1002 and 1004 have been screwed into the U-shape slots 328A and 328B, respectively; screws 1006 and 1008 have been screwed into the U-shape slots 228A and 228B, respectively. Due to their shape, the brackets 326 and 226 are also referred to as H-shape brackets. In some implementations, the brackets 326 and 226 may be of different shapes. For example, the bracket 326 may be of a U-shape; while the bracket 226 may be a square or rectangle shape.

Using U-shape slots, instead of hole- or full circle-shape slots (as shown in FIG. 4), are technically advantageous. Because U-shape slots enable the cable management tool 1000 to be removed from a chassis without completely removing any one of the screws 1002, 1004, 1006, and 1008 from the cable management tool 1000 (or the U-shape slots thereon, e.g., 328A, 328B, 228A, or 228B). One or more of the screws 1002, 1004, 1006, and 1008 need only be loosened (but not completely removed) to remove the cable management tool 1000 from the chassis or adjust the cable management tool 1000's position on the chassis. This is significant because there is often little space within a cable rack and removing a component from the rack is usually difficult, e.g., requiring removing multiple other components first. Using U-shape slots also enables the vertical adjustment of the position of the cable management tool 1000 without removing any screws previously installed on the cable management tool 1000.

Figure 11:
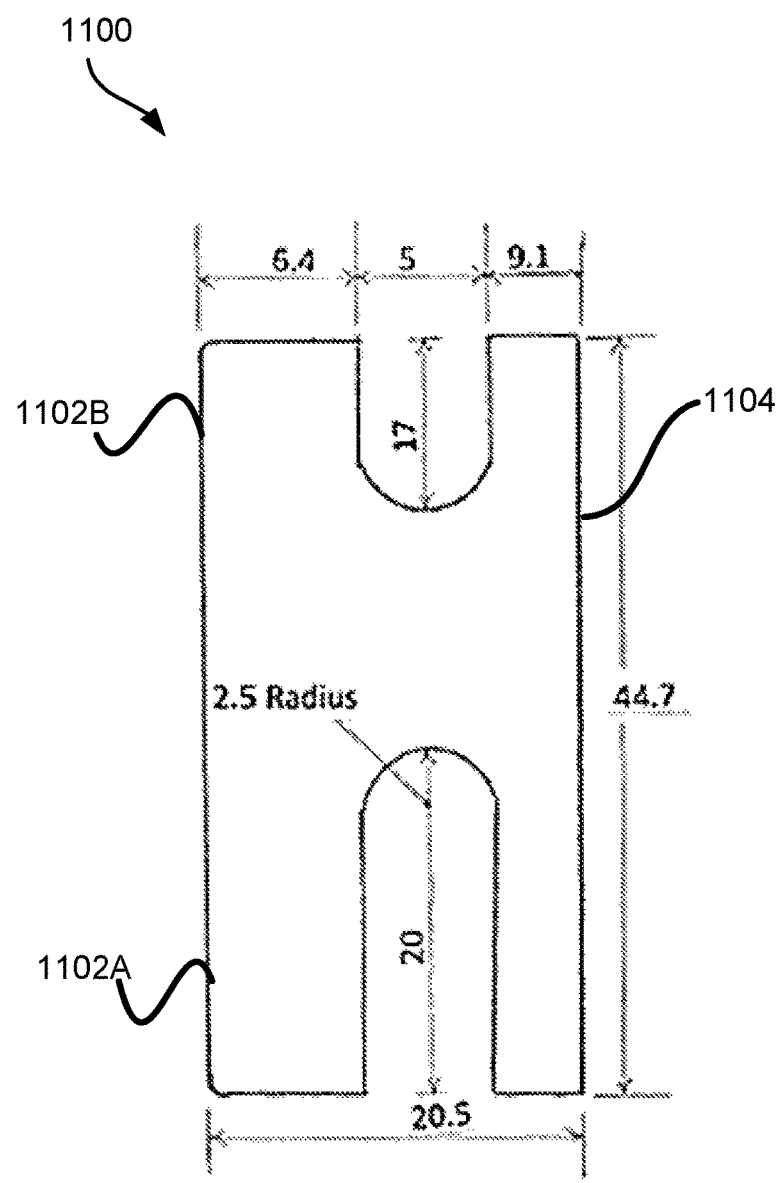
FIG. 11 is a block diagram illustrating example dimensions of the second example cable management tool, in accordance with one or more embodiments.

FIG. 11 is a block diagram illustrating example dimensions of a portion of the second example cable management tool 1100, in accordance with one or more embodiments. The example dimensions 1100 shown in FIG. 11 are in millimeters.

The U-shape slots on the same bracket 1104 may have different dimensions. As shown in FIG. 11, for example, the U-shape slot 1102A has a depth of 20 millimeters; while the U-shape slot 1102B has a depth of 17 millimeters. This size difference would allow the cable management tool 1100 to be position-adjusted vertically (e.g., in the up or down direction) on a chassis. This size difference would also allow the cable management tool 1100 to be used in a reserved fashion, e.g., upside down.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first set of slots could be termed a second set of slots, and, similarly, a second set of slots could be termed a first set of slots, without changing the meaning of the description, so long as all occurrences of the "first set of slots" are renamed consistently and all occurrences of the "second set of slots" are renamed consistently. The set of slots and the second set of slots are both sets of slots, but they are not the same set of slots.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A cable management tool, comprising: an elongated body portion having one or more sets of slots configured to be filled with cable ties, wherein each set of slots of the one or more sets of slots has at least two slots with a same shape; a first part extending from a first end of the body portion and configured to be attached to a chassis, wherein the first part includes: a first arm portion having a first length, a first U-shape slot on a first end of the first arm portion, a second U-shape slot on a second end of the first arm portion, wherein the first U-shape slot and the second U-shape slot have their openings point at opposite directions, thereby forming a first H-shape, and are configured to enable vertical movement of the first arm portion, and the first end and the second end are opposite ends of the first arm portion; a second part extending from a second end of the body portion and configured to be attached to the chassis, wherein the second part includes: a second arm portion having a second length, a third U-shape slot on a first end of the second arm portion, a fourth U-shape slot on a second end of the second arm portion, wherein the third U-shape slot and the fourth U-shape slot have their openings point at opposite directions, thereby forming a second H-shape, and are configured to enable vertical movement of the second arm portion, and the first end and the second end are opposite ends of the second arm portion, wherein the one or more sets of slots include a first set of vertical pairs of slots and a second set of horizontal pairs of slots, wherein the first set of vertical pairs of slots and the second set of horizontal pairs of slots include a same number of pairs of slots.

2. The cable management tool of claim 1, wherein the first U-shape slot and the second a first U-shape slot have different depths.

3. The cable management tool of claim 1, wherein the first U-shape slot and the second a first U-shape slot have a same depth.

4. The cable management tool of claim 1, wherein the body portion is made of metal.

5. The cable management tool of claim 1, wherein the body portion is of a rectangular bar shape.

6. The cable management tool of claim 1, wherein the body portion is configured to support a predefined number of cables.

7. The cable management tool of claim 6, wherein one or more cables may be positioned across the body portion and beyond the first end of the body portion.

8. The cable management tool of claim 1, wherein the first part and the second part form a gap between the first part, the second part, and the body portion.

9. The cable management tool of claim 1, wherein the body portion, the first part and the second part are a monolithic metallic structure.

10. The cable management tool of claim 1, wherein the elongated body portion includes a hard-surface.

11. The cable management tool of claim 10, wherein the hard-surface provides a predefined degree of movement-resistance.

12. The cable management tool of claim 1, wherein the first arm portion and the second arm portion are of different shapes.

13. The cable management tool of claim 1, wherein the one or more sets of slots include a first set of slots and a second set of slots, wherein the first set of slots are perpendicular to the second set of slots.

14. The cable management tool of claim 13, wherein the first set of slots includes slots of a first shape, and the second set of slots includes slots of a second shape different from the first shape.

15. The cable management tool of claim 13, wherein the first set of slots includes slots of a first size, and the second set of slots includes slots of a second size different from the first size.

16. The cable management tool of claim 1, wherein the first set of slots includes a predefined distance between each slot in the first set of slots.

17. The cable management tool of claim 1, wherein the first part and the second part, when attached to the chassis, causes the body portion to be secured to the chassis.

18. The cable management tool of claim 1, wherein the cable management tool is configured to reversibly attach to the chassis upside down.

19. The cable management tool of claim 1 is configured to be used in an upside down fashion.

* * * * *